United States Patent [19]
DeLuca et al.

[11] Patent Number: 5,181,227
[45] Date of Patent: * Jan. 19, 1993

[54] RECEIVER HAVING A SIGNAL DETECTOR AND BIT SYNCHRONIZER

[75] Inventors: Michael J. DeLuca, Boca Raton; Richard A. Erhart, Boynton Beach; Joan S. DeLuca, Boca Raton, all of Fla.

[73] Assignee: Motorola, Inc., Schaumburg, Ill.

[*] Notice: The portion of the term of this patent subsequent to Dec. 31, 2008 has been disclaimed.

[21] Appl. No.: 773,173

[22] Filed: Oct. 8, 1991

Related U.S. Application Data

[63] Continuation of Ser. No. 460,215, Jan. 2, 1990, Pat. No. 5,077,758.

[51] Int. Cl.$^5$ .................. H03D 03/00; H03C 27/06
[52] U.S. Cl. .................................... 375/95; 375/121; 340/825.65; 455/229; 455/343
[58] Field of Search ............ 375/94, 95, 121, 75, 375/10; 455/127, 343, 229; 328/109, 110, 119; 370/105.1; 371/24; 340/825.65, 825.14; 307/510, 517

[56] References Cited

U.S. PATENT DOCUMENTS 4,419,765 12/1983 Wycoff et al. ............... 455/227 X Primary Examiner—Curtis Kuntz
Assistant Examiner—Tesfaldet Bocure
Attorney, Agent, or Firm—Floyd E. Anderson; William E. Koch; Thomas G. Berry

[57] ABSTRACT

An apparatus and method for processing a signal is capable of determining the presence of absence of a signal having a predetermined baud rate. By initializing counting registers to either first or second values, and receiving the signal, either the presence or absence of the baud rate may be more rapidly detected. Rapid detection provides for improved battery savings when the invention is used within a portable receiver such as a pager. The invention provides for positive detection of the predetermined baud rate while rejecting a baud rate being an integer divisor of the predetermined baud rate. Additionally, as a result of the determination of the presence of the predetermined baud rate, a sample clock may be established for receiving data at the baud rate.

22 Claims, 10 Drawing Sheets

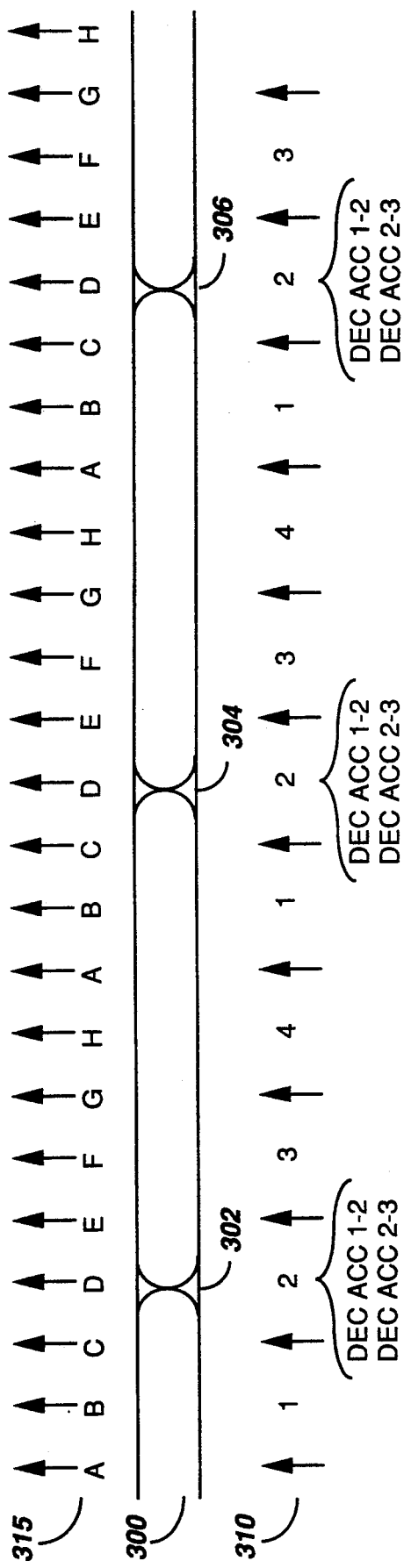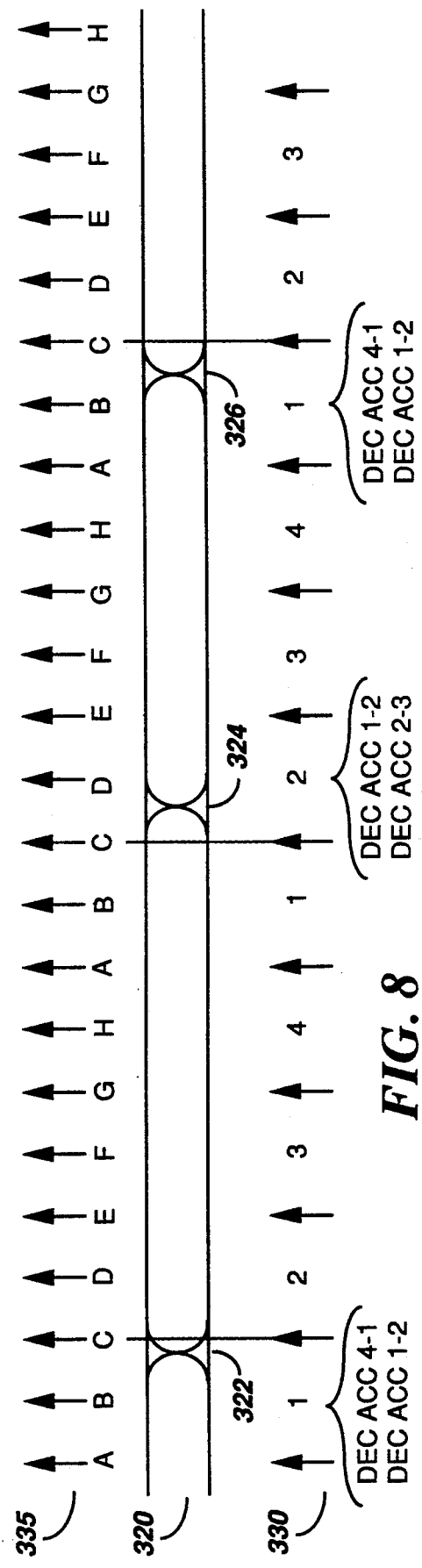

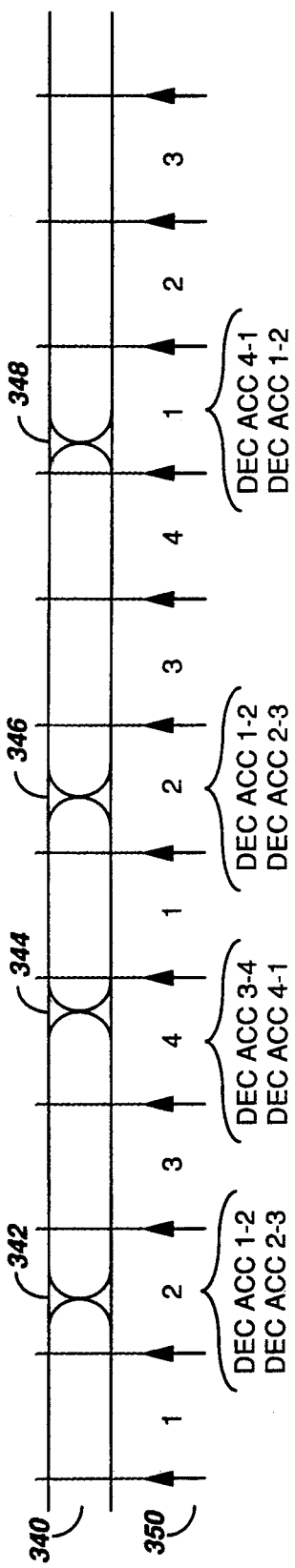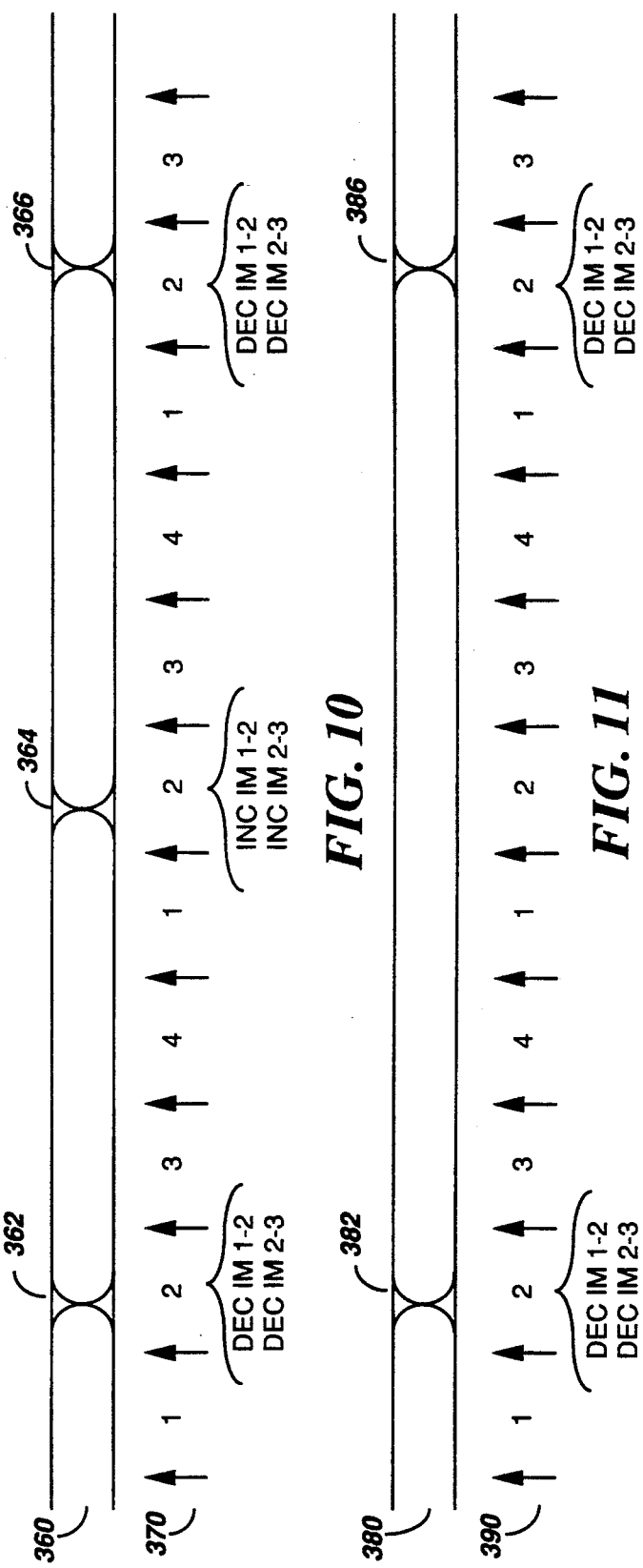
FIG. 9  FIG. 10  FIG. 11

| SAMPLE WINDOW | 1 | 2 | 3 | 4 |
|---|---|---|---|---|
| TOTAL EDGES = 16 | 0 | 15 | 1 | 0 |
| ACCUMULATED | 1-2 | 2-3 | 3-4 | 4-1 |
| COUNTS | 15 | 16 | 2 | 0 |
| RESULT AT SIGNAL THRESHOLD = 13 | ≤0 | ≤0 | ≥1 | ≥1 |
| RESULT AT NOISE THRESHOLD = 4 | ≤0 | ≤0 | ≥1 | ≥1 |

*FIG. 12*

| SAMPLE WINDOW | 1 | 2 | 3 | 4 |
|---|---|---|---|---|
| TOTAL EDGES = 32 | 14 | 12 | 1 | 5 |
| ACCUMULATED | 1-2 | 2-3 | 3-4 | 4-1 |
| COUNTS | 26 | 13 | 6 | 19 |
| RESULT AT SIGNAL THRESHOLD = 26 | ≤0 | ≥1 | ≥1 | ≥1 |
| RESULT AT NOISE THRESHOLD = 7 | ≤0 | ≤0 | ≥1 | ≤0 |

*FIG. 13*

| SAMPLE WINDOW | 1 | 2 | 3 | 4 |
|---|---|---|---|---|
| TOTAL EDGES = 16 | 4 | 6 | 2 | 4 |
| ACCUMULATED | 1-2 | 2-3 | 3-4 | 4-1 |
| COUNTS | 10 | 8 | 6 | 8 |
| RESULT AT SIGNAL THRESHOLD = 16 | ≥1 | ≥1 | ≥1 | ≥1 |
| RESULT AT NOISE THRESHOLD = 4 | ≤0 | ≤0 | ≤0 | ≤0 |

*FIG. 14*

RECEIVER HAVING A SIGNAL DETECTOR AND BIT SYNCHRONIZER

This is a continuation of application Ser. No. 07/460,215, filed Jan. 2, 1990, and issued as U.S. Pat. No. 5,077,758, on Dec. 31, 1991.

BACKGROUND OF THE INVENTION

1. Field of the Invention

This invention relates generally to the area of synchronizing to data transmissions received by a data receiver. Particularly this invention relates to a signal detector and bit synchronizer for use in a portable paging receiver.

2. Description of the Prior Art

Bit synchronization to a digital transmission is a process used to determine the presence of symbol boundaries of a data transmission and thereafter to provide a bit clock to synchronously sample data bits, or data symbols from the data transmission. Bit synchronization may be a process used in a paging receiver decoding a digital signaling protocol proposed by British Telecom in England which is commonly termed POCSAG (Post Office Code Standardization Advisory Group).

Synchronization to such a protocol is known and has been described in detail in U.S. Pat. No. 4,518,961, May 21, 1985, to Davis et al. which shows synchronization to either the POCSAG or a Golay signalling protocols. Additionally, U.S. Pat. No. 4,506,262, Mar. 19, 1985 to Vance et al. shows synchronization to POCSAG using an early/late phase locked loop with course and fine synchronization modes.

Line 10 of FIG. 1 shows a typical POCSAG signal. Prior to the signal, noise or another type of protocol may be transmitted as shown in area 12 enclosed in a broken line. The POCSAG signal begins with a preamble signal, 14, which consists of a number of one-zero transitions. The preamble is followed by a plurality of thirty two bit information words, each coded in a 31,21 extended BCH code (32,21). The information words begin with a sync code word 16a which contains predetermined binary sequence. Every seventeenth word thereafter another sync code, 16b, occurs in the signal. Between the sync codes, the information is structured as 8 information frames each of which contains two 32,21 words. For illustration, the contents of frame 4, as indicated by the number 18 in the figure, is shown on line 34. Line 34 has two 32 bit words, 36 and 38, each information word having 32 data bits structured in the 32,21 format. It can be appreciated that the data bits shown on line 34 can appear to be effectively a random sequence.

The sync code provides a means for frame synchronization to the signal. Thus it is desirable to first bit synchronize to the preamble signal and subsequently frame synchronize to the sync code. Line 20 shows the operation of a pager synchronizing to the POCSAG signal. During interval 22 and 24, the pager is attempting to synchronize to the signal. However, the signal is not present. During interval 26, the preamble signal, 14, is present, the pager bit synchronizes and finds sync code 16a. Then in a known manner, the pager decodes information in preassigned frame 4 as shown by intervals 28 and 32. The pager also tests for sync code 16b during interval 30 in order to determine the continued presence of the transmission.

In some instances, the preamble signal may be corrupted by noise rendering the the preamble signal undetectable. In this situation, it is desirable to acquire bit synchronization on the data bits within the thirty two bit words, and subsequently frame synchronize to one of the periodic sync code signals. The bit synchronization process in this mode is more difficult because the data in the thirty two bit words is effectively random. Consequently, it is desirable to provide a selective call receiver capable of acquiring bit synchronization on either a POCSAG preamble signal or data signals within POCSAG information words.

Battery life is a critical aspect of portable selective call receivers and it is desirable to conserve battery power whenever possible. In the absence of the POCSAG signal, selective call receivers operate in a low power mode and periodically activate receiving and decoding circuitry in order to detect the presence of the POCSAG signal. If no signal is detected, the paging receiver again operates in a low power mode. This process conserves battery power. Thus it is desirable to quickly detect the absence of the signal in order to hasten the return to the low power mode.

Consequently, it is desirable to provide a means for detecting the absence of the POCSAG signal in a minimal time, in doing so, additional battery power may be conserved. Prior art pagers have typically analyzed a predetermined number of transitions and in response to various algorithms determine the absence of the POCSAG signal. One such algorithm is shown in U.S. Pat. No. 4,554,665, Nov. 19, 1985 to Beesley. However, such using a predetermined number of transitions requires waiting for all of the transitions to occur. Such techniques suffer greatly under conditions where transitions occur relatively infrequently, such as when low frequency tones are transmitted in place of the POCSAG signal. While waiting for all of the transitions to occur the prior art receivers are consuming additional battery power. It is possible to anticipate whether the signal being received includes either the desired baud rate or not. If it is anticipated that the signal includes the desired baud rate it is desirable to configure a synchronizer to more rapidly detect the presence of the baud rate. While if it is anticipated that the signal does not include the desired baud rate, it is desirable to configure a synchronizer to rapidly detect the absence of the baud rate.

Furthermore, prior art paging receivers typically establish a predetermined relationship between the sensitivity of detecting the POCSAG signal in a noise environment and falsely detecting a POCSAG signal when only noise or another signal is present. Since upon the detection of the absence of a POCSAG signal, power is conserved by deactivating the receiver, this establishment results in a certain average battery power consumption while searching for signal. However because paging receivers are used in many different paging environments around the world, a sensitivity and falsing and battery power consumption performance in one application may not be optimal for another application. Thus it is desirable to construct a bit synchronizer for a paging receiver with easily variable sensitivity, falsing and power consumption characteristics.

Yet further, a new version of the POCSAG signal has a 1200 baud data rate. Typically bit synchronizers capable of synchronizing to a data transmission having random data at 1200 baud will also synchronize to data transmissions being an integer divisor of that data rate (600, 300 baud). However, the Golay Sequential Code (GSC) is another paging protocol which transmits message information at 600 and 300 baud. Thus it is desirable to positively and accurately detect the presence of 1200 baud data while being able to reject signals consisting only of a baud rate which is an integer divisor of 1200 baud.

Finally, in order to conserve power in a paging receiver having a microcomputer, it is desirable to provide a bit synchronizer capable of operating at a reduced microcomputer bus speed. Prior art paging receivers with microcomputers typically sample the incoming signal at a very high rate, and typically use a digital phase locked loop implemented in software in order to establish a bit clock for sampling data bits after synchronization. Software generated digital phase locked loops require high sampling rates and continuous phase adjustments in a real time software environment. This requires a microcomputer to operate at a relative high bus rate. U.S. Pat. No. 4,414,676, Nov. 8, 1983 to Kraul et. al. shows a synchronizer which in the preferred embodiment samples at five times the data rate and performs numerous calculations between each sample. Kraul et. al. does not show the capability to synchronize on random data. Thus it is desirable to construct a bit synchronizer which provides for a low sample rate. It is desirable to construct a bit synchronizer which in one operation establishes a bit clock synchronized to the data signal. These operations will provide for operating the microcomputer at a reduced bus rate thereby reducing the power consumption and extending the battery life of the paging receiver.

SUMMARY OF THE INVENTION

It is therefore an object of the present invention to provide a means for resolving the aforementioned issues.

It is an object of the present invention to provide a means for determining the presence or absence of signal of a predetermined baud rate.

It is another object of the present invention to provide a means for establishing a bit clock synchronized to the baud rate.

It is yet another object of the present invention to vary threshold values in order to modify the sensitivity and falsing characteristics of a signal detector.

It is yet another object of the present invention to provide a means for adjusting the integration time in order to modify the battery power consumption versus the sensitivity and falsing characteristics of a signal detector.

It is yet another object of the present invention to provide a bit synchronizer implemented within a microcomputer that allows the microcomputer to operate at a reduced bus rate.

In accordance with the present invention, a means for detecting the presence of a signal having transitions between symbols occurring at a predetermined baud rate comprises:

a multiplicity of counting registers;

means for establishing an integer number of samples windows per symbol, each sample window having a corresponding unique combination of a plurality of counting registers within said multiplicity of counting registers;

means for receiving a signal potentially including the signal and producing a received signal having transitions;

means for sensing the transitions of the received signal occurring within each established sample window;

means for counting in the counting registers corresponding to each sample window in which a transition is sensed; and means for generating a presence signal in response to a counting register having a predetermined number of counts.

In accordance with the present invention, a means for detecting the absence of a signal having transitions between symbols occurring a predetermined baud rate comprises:

a multiplicity of counting registers;

means for establishing an integer number of samples windows per symbol, each sample window having a corresponding unique combination of a plurality of counting registers within said multiplicity of counting registers;

means for receiving a signal potentially including the signal and producing a received signal having transitions;

means for sensing the transitions of the received signal occurring within each established sample window;

means for counting in the counting registers corresponding to each sample window in which a transition is sensed; and means for generating an absence signal in response to all of the counting registers exceeding a predetermined number of counts.

In accordance with the present invention, a means for selectively detecting the presence or absence of a signal having transitions between symbols occurring a predetermined baud rate comprises:

a multiplicity of counting registers;

means for establishing an integer number of samples windows per symbol, each sample window having a corresponding unique combination of a plurality of counting registers within said multiplicity of counting registers;

means for selecting either presence detection or absence detection;

means for receiving a signal potentially including the signal and producing a received signal having transitions;

means for sensing the transitions of the received signal occurring within each established sample window;

means for counting in the counting registers corresponding to each sample window in which a transition is sensed; and means generating a presence signal in response to the selection of presence detection and a counting register having a first predetermined number of counts; and means for generating an absence signal in response to the selection of absence detection and all of the counting registers exceeding a second predetermined number of counts.

BRIEF DESCRIPTION OF THE DRAWINGS

FIG. 7 illustrates the response of the signal detector to a strong signal.

FIG. 8 illustrates the response of the signal detector to a weak signal.

FIG. 9 illustrates the response of the signal detector to the absence of a signal, or the presence of noise.

FIG. 10 illustrates the response of the signal detector to a strong signal having the desired baud rate.

FIG. 11 illustrates the response of the signal detector to a strong signal having the baud rate one half of the desired baud rate.

FIG. 12 shows a table indicating the operation of the invention under conditions similar to those of FIG. 7.

FIG. 13 shows a table indicating the operation of the invention under conditions similar to those of FIG. 8.

FIG. 14 shows a table indicating the operation of the invention under conditions similar to those of FIG. 9.

DESCRIPTION OF A PREFERRED EMBODIMENT

Figure 2:
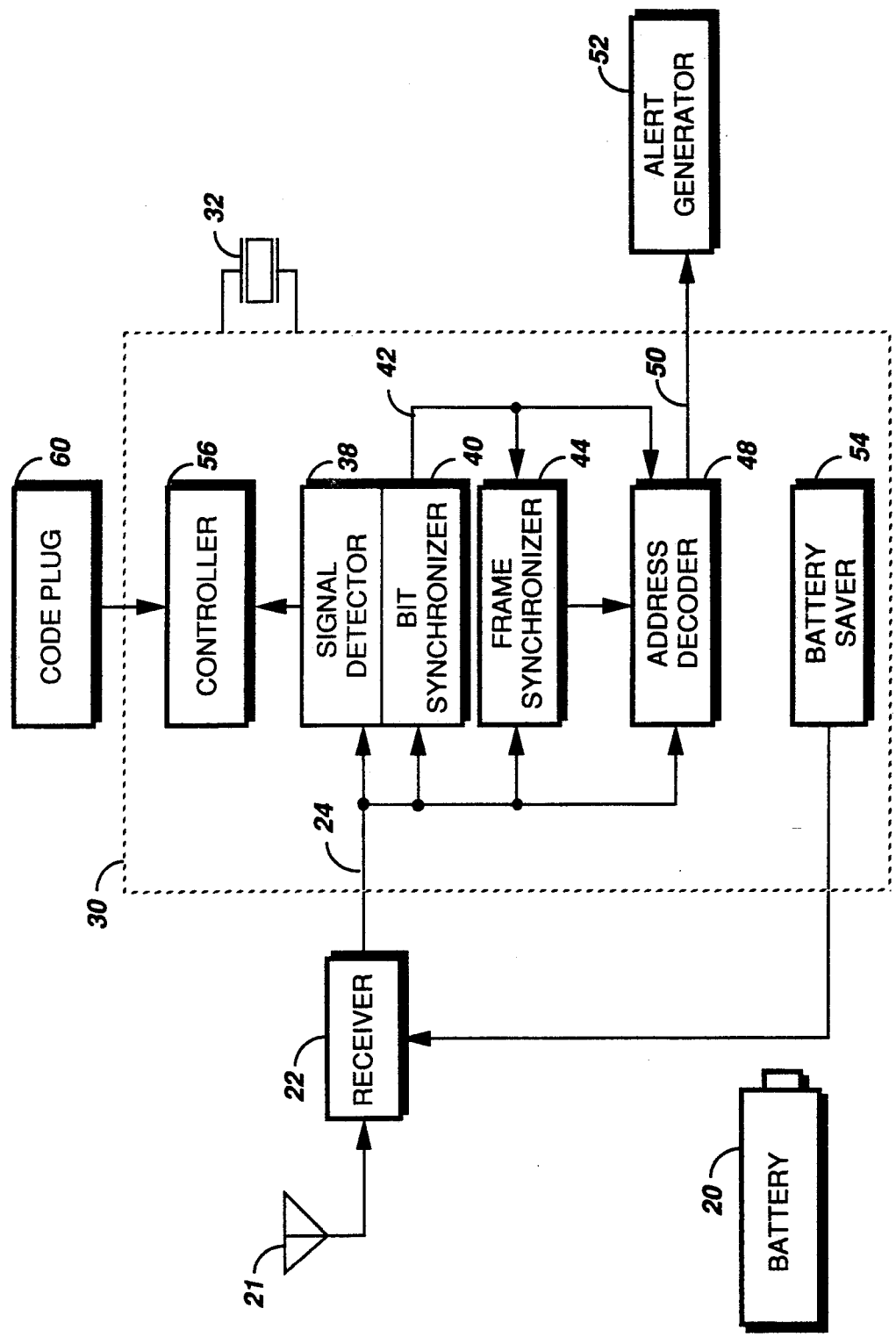
FIG. 2 shows a block diagram of a paging receiver in accordance with the present invention.

FIG. 2 shows a block diagram of a paging receiver which includes the present invention. The receiver is powered by battery 20 which may be a AAA sized battery. The battery supplies operating power for the circuits within the paging receiver. Antenna 21 receives POCSAG signal frequency modulated onto a radio signal. Receiver 22 receives the frequency modulated signal and through a process well known in the art demodulates and recovers the binary POCSAG signal which is output on line 24. In the absence of POCSAG signals, the received signal on line 24 has the equivalent of noise signals or other signals.

The received signal is processed by a decoder means 30, which includes functions shown enclosed by a broken line. The decoder means is driven by a crystal 32, which provides a time base for decoding operations. The received signal 24 is processed by signal detector 38 which detects the presence or absence of the POCSAG baud rate, and bit synchronizer 40 which bit synchronizes to the POCSAG signal. Bit clock signal 42 is used by frame synchronizer 44, in order to detect the POCSAG sync code occurring within the received signal 24, and generate a framing signal 46 in response to detection of the sync code. In one embodiment, the bit synchronizer may be a phase lock loop which is used to generate the bit clock, or in another embodiment the bit clock may be generated as a result of processes performed by the signal detector. Address decoder 48 uses the bit clock signal 42, and the framing signal 46 in order to detect a predetermined address occurring with the received signal 24. The address decoder generates an alert signal 50 in response to the detection of the address. The alert signal causes alert generator 52 to generate an alert which may be seen or heard by the user of the paging receiver. Battery saver 54 periodically renders the receiver 22 operational. Controller 56 supplies timing signals to the functions within the decoding means 30 in order to cause the proper operation and cooperation of the functions in order to decode the POCSAG signal and to conserve power consumption. Controller 56 also reads code plug 60 which includes information such as the predetermined address used by address decoder 48 and operational characteristics used by signal detector 38 and/or bit synchronizer 40. Signal detector 38 also detects the absence of POCSAG signal and produces an absence signal which is used by controller 56 to cause battery saver 54 to conserve power.

The functions of control means 30 may be implemented in hardware circuits, however, the preferred embodiment implements these function blocks in a program having software routines which operate within host microcomputer. A host microcomputer such as the Motorola MC146805H2 microcomputer may readily implement these functions and is a preferred host microcomputer. Descriptions are well known in the art that enabling one skilled in the art to, with a microcomputer within a receiver, control the receiver, decode transmitted signal, and make the invention as described herein. Such descriptions include U.S. Pat. No. 4,518,961, May 21, 1985, to Davis et al, U.S. Pat. No. 4,649,583, Mar. 10, 1987 to DeLuca et al, and U.S. Pat. No. 4,755,816, Jul. 5, 1988, to DeLuca which are hereby incorporated by reference.

Figure 3:
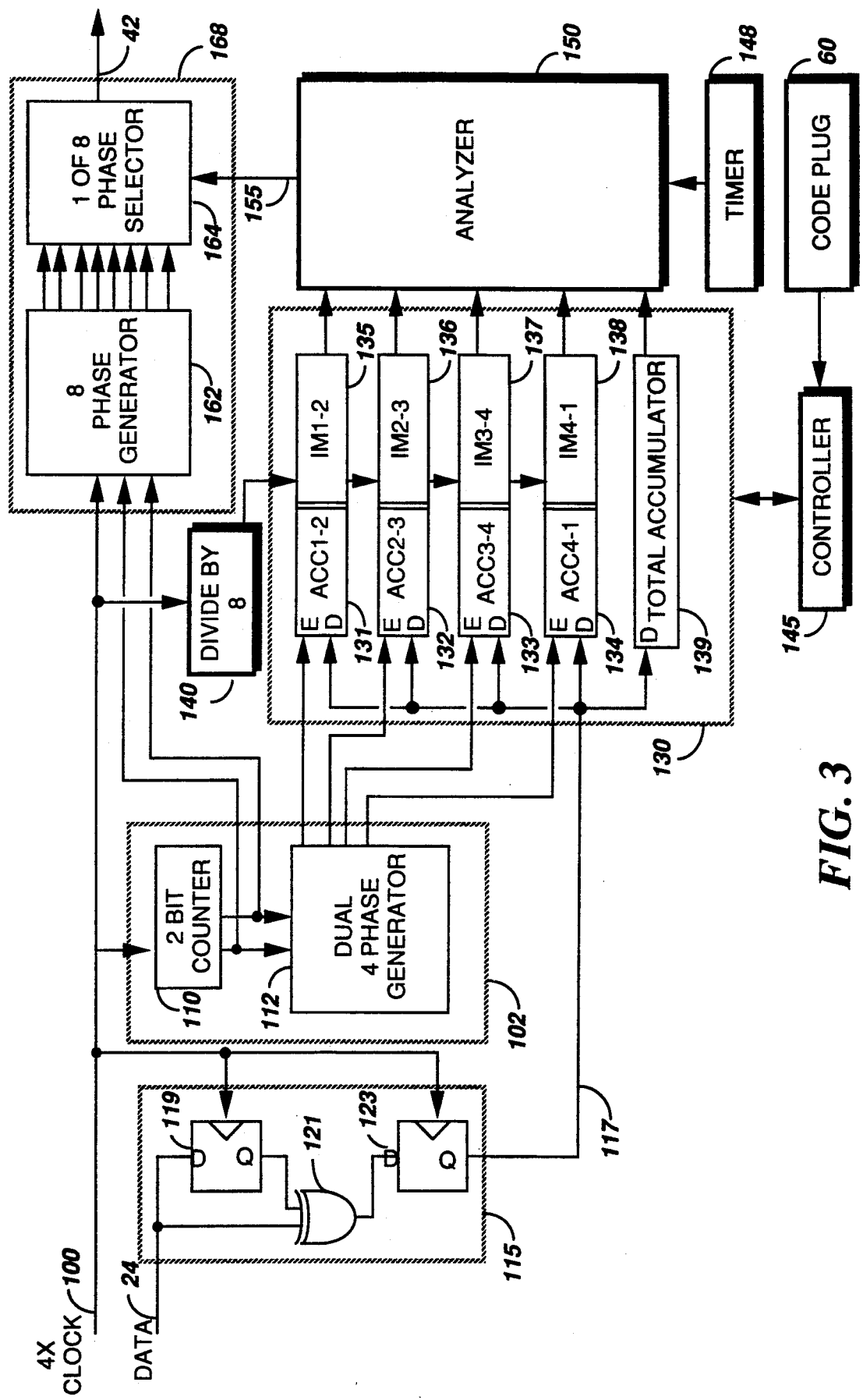
FIG. 3 shows a block diagram of a synchronizer operating in accordance with the present invention.

FIG. 3 shows a block diagram of signal detector 38 and bit synchronizer 40 which operates in accordance with the present invention. A clock signal 100 has a frequency four times the desired baud rate, is derived from the crystal 32, and provides timing for the operation of the signal detector and bit synchronizer. Clock signal 100 drive phase generating means 102 which produces four phase signals 104-107. Each phase is independent and represents one half of a bit and each phase is spaced a quarter bit from the prior phase. This may be accomplished using a two bit counter 110 to drive a four phase generator 112.

Clock signal 100 also drives transition detecting means 115 which produces a transition signal 117 in response to a zero to one transition or a one to zero transition on the received signal input 24. Flip flop 119 in a "D" flip flop which samples and latches the data. Exclusive OR gate 121 compares the received signal 24 with the delayed signal from flip flop 119. If a transition has occurred, exclusive OR gate 121 will produce a pulse in response to the transition. The pulse is latched by flip flop 123, the output of which produces the transition signal 117.

Counting means 130 operates during an integration time and has nine accumulators 131-139 or counting registers. Accumulators 131-134 and 135-138 are selectively enabled by the four phase signals 104-107 respectively, each accumulator being enabled for one half of a bit time. Accumulators 135-139 are hereinafter referred to as image registers 135-138. If a transition signal occurs while an accumulator is enabled, the accumulator is decremented. Accumulator 139 is always enabled during the integration time and is decremented in response to each transition signal. The values within accumulators 131-135 represent transitions accumulated during each of four one half bit intervals. Image registers 135-138 operate similarly to corresponding accumulators 131-134 with the exception that the image registers are either incremented or decremented in response to a signal from divider 140. The signal causes an image register to increment in response to an edge occurring on even bits and to decrement in response to a edge occurring on odd bits (even and odd being arbitrarily assigned).

In an example of operation, controller 145 determines to search for the presence of a signal having a predetermined baud rate and reads initialization values from code plug 60. Counting means 130 is programmed to search for the presence of a signal by initializing each accumulator 131-134 with a value of 13, clearing image registers 135-138 and initializing the total accumulator 139 with a value of 16 and sampling the received signal. If any accumulator 131-134 reaches a value of zero before the total accumulator 139 reaches a value of zero, a signal is detected. If however total accumulator 139 reaches a value of zero first, the absence of signal is detected. Upon detection, the absolute value of image registers 135-138 is examined. If every register has a value less than or equal to 12, the presence of the desired baud rate is determined.

In another example of operation, counting means 130 may be programmed to search for the absence of a signal having a predetermined baud rate by initializing each accumulator 131-134 with a value of 4, clearing image registers 135-138 and initializing the total accumulator with a value of 16 and sampling the received signal. If every accumulator 131-134 reaches a value of zero before the total accumulator 139 reaches a value of zero, a signal absence is detected. If however total accumulator 139 reaches a value of zero first, signal is detected. Upon detection of the presence of signal, the absolute value of image registers 135-138 is examined. If every register has a value less than or equal to 12, the presence of the desired baud rate is determined.

In either of the aforementioned examples, a bit clock indicative of the center of the bit may be established in response to the detection of the predetermined baud rate and the values within accumulators 131-134. Also controller 145 initializes timer 148 in response to values in the code plug 60. If timer 148 times out before either signal or absence of signal is detected, the received signal has too few transitions, and the absence of signal is determined.

The analyzing means 150, monitors accumulators 131-134 and 139, and timer 148 in order to determine the presence or absence of signal. Additionally, analyzing means generates signal 155 which selects one of 8 phases for center sampling the bits within the signal upon detecting the presence of the baud rate. The operation of analyzing means 150 is described in more detail with respect to FIGS. 5 and 6.

In response to signal 155, bit clock generating means 168 generates a bit clock 42 on one of eight phases. The bit clock generating means has an eight phase generator 162 which is responsive to clock signal 100 and the two bit counter 102. The combination provides for the selection of 4 phases equivalent to the four phases which drive the counting means as well as four more phase in between. One of the outputs of phase generator 162 is selected by selector 164 in response to signal 155, thereby establishing the bit clock.

Figure 4:
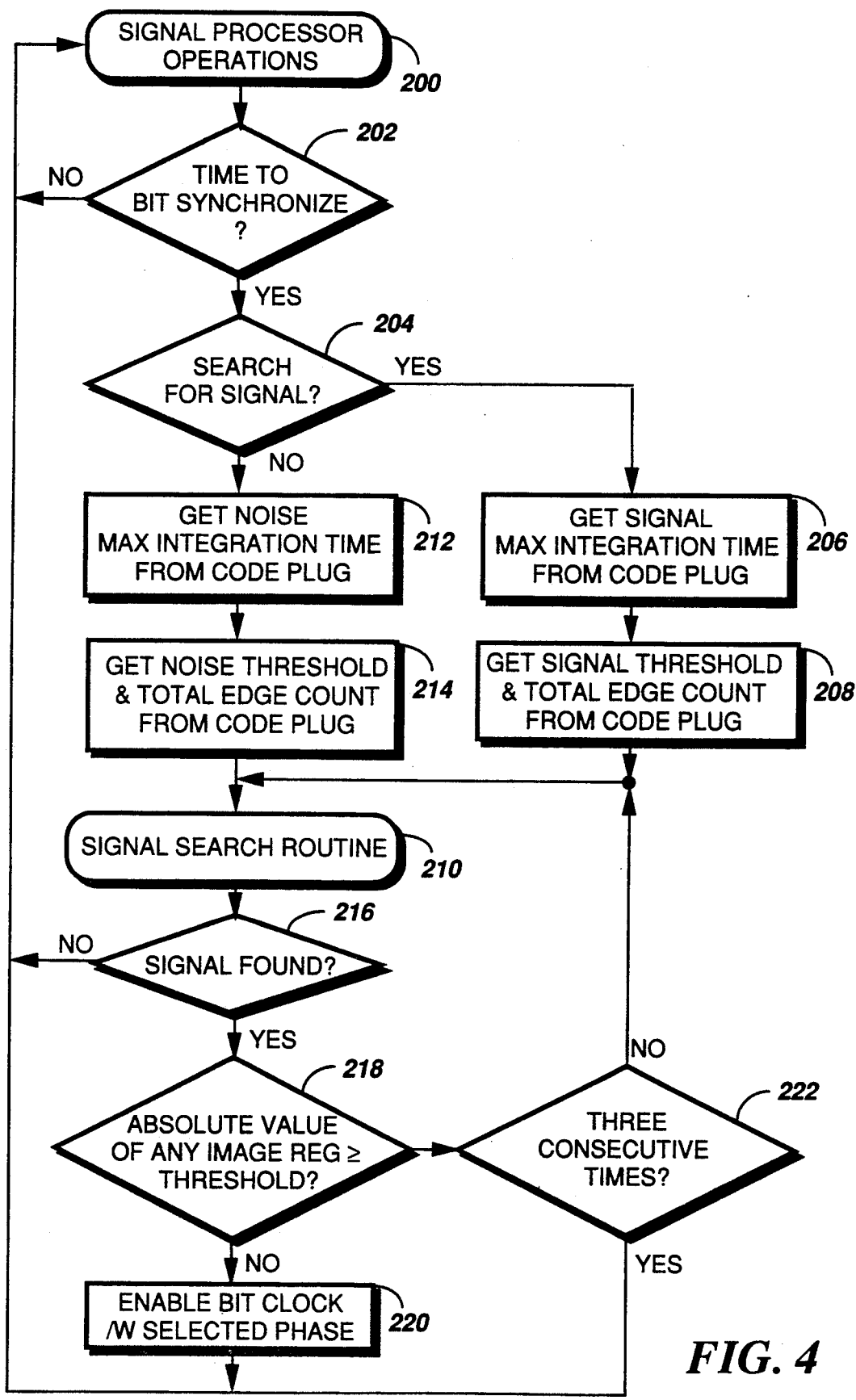
FIG. 4 shows signal detection and bit synchronization as a task operating in a multi-tasking program operating within the microcomputer operating within the paging receiver.
Figure 5:
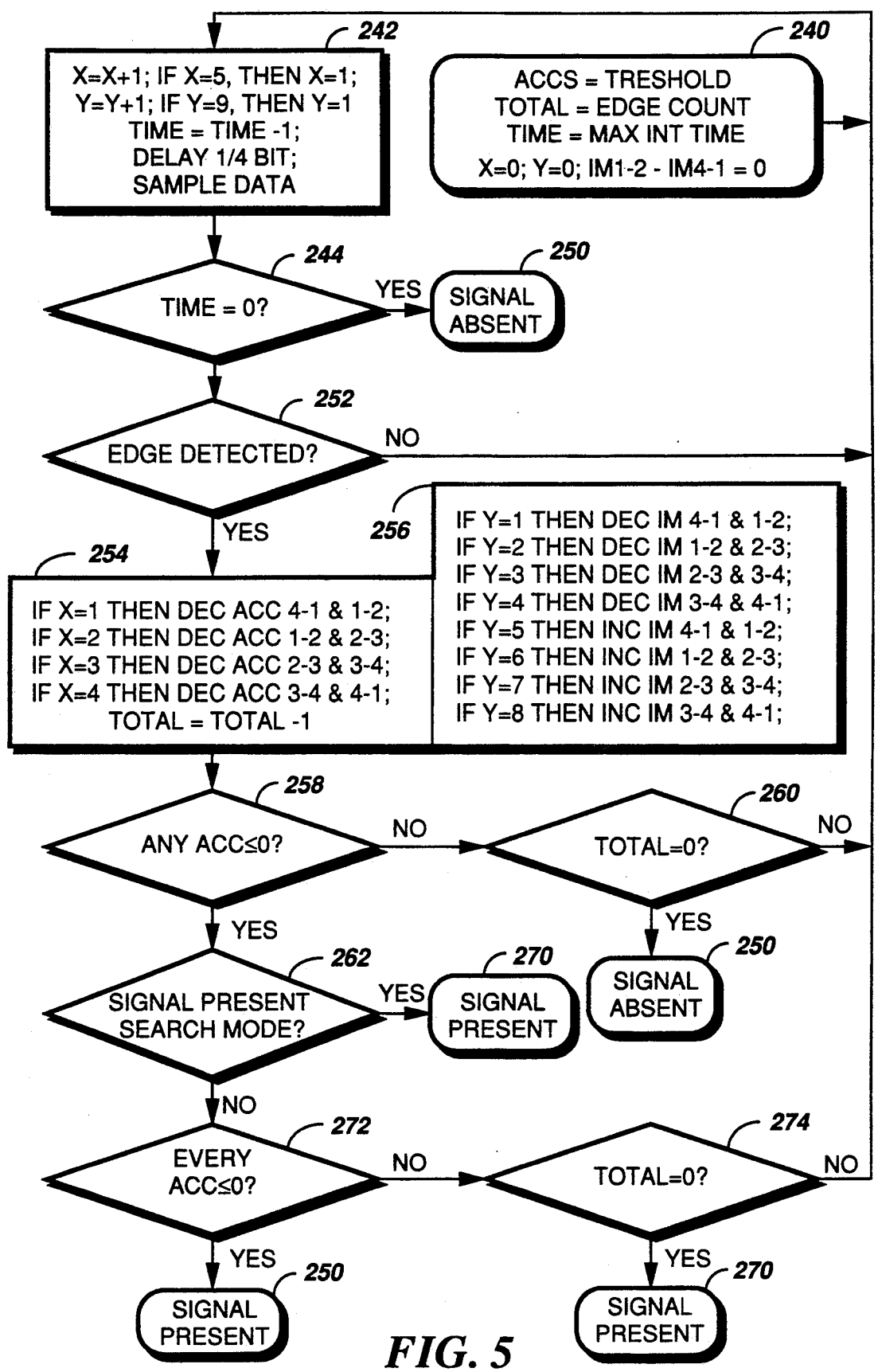
FIG. 5 shows the operation of the signal search routine of FIG. 4.
Figure 6:
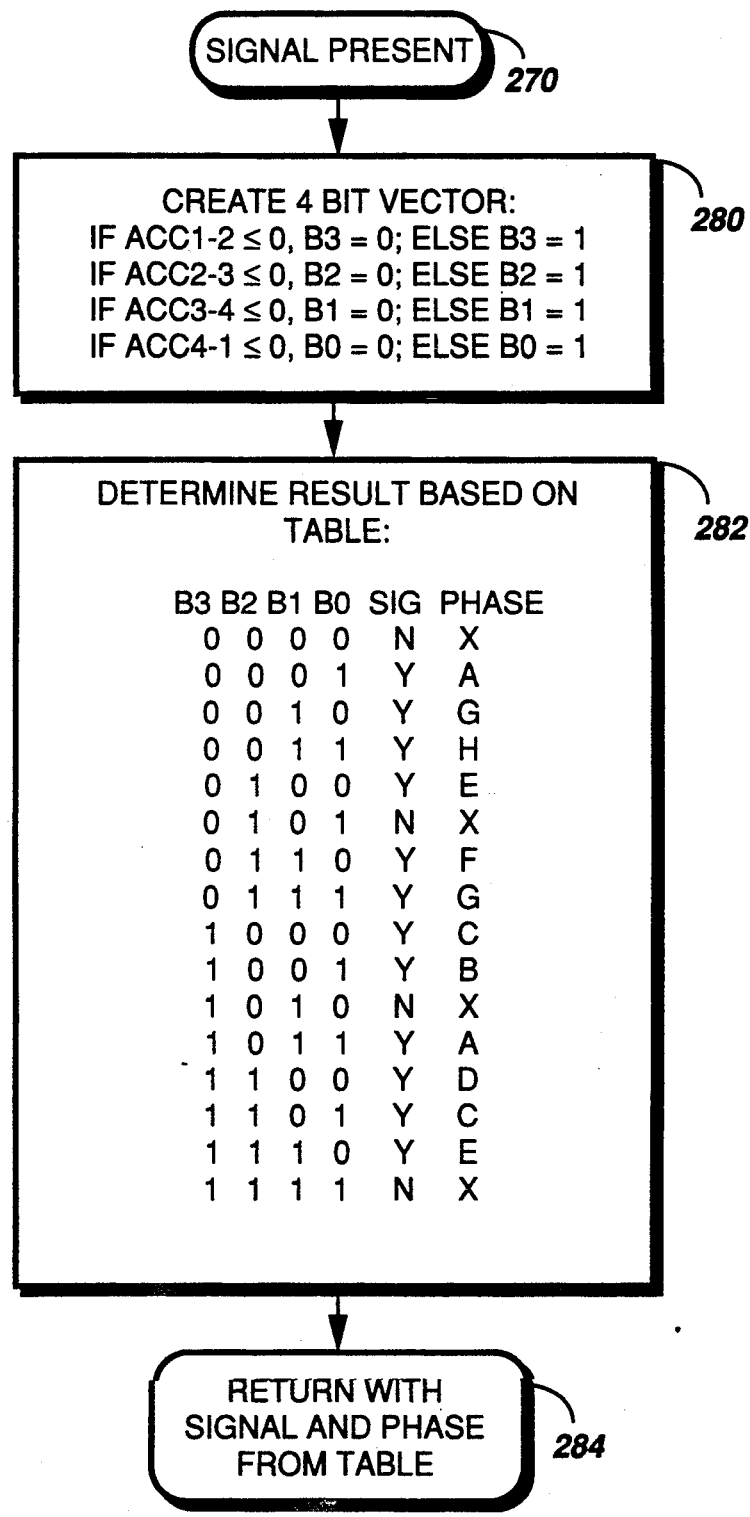
FIG. 6 shows selecting the phase of the bit clock in response to the detection of the presence of the signal.

While FIG. 3 shows a hardware implementation of the invention, FIGS. 4, 5 and 6 show a software implementation of the invention operating within a microcomputer. FIG. 4 shows signal detection and bit synchronization as a task operating in a multi-tasking program operating within the microcomputer operating within the paging receiver. Step 200 is indicative of the signal processor operations such as battery saving, frame synchronization, addresses detecting and message decoding. Step 202 determines if it is time to perform a signal search. If false, the program returns to step 200. If true, step 204 determines if the signal processor operations selected either the signal presence search mode or search for the signal absence search mode. If the signal presence search mode is selected, step 206 reads the maximum integration time from the code plug and step 208 reads the absence threshold and total edge count from the code plug corresponding to the signal presence search mode. Then in step 210 the signal search routine is executed. The signal search routine is described in FIGS. 6 and 7. Alternately, if in step 204, the signal absence mode is selected, step 212 reads the maximum integration time from the code plug and step 214 reads the signal threshold and total edge count from the code plug corresponding to the signal absence search mode. Then the in step 210 the signal search routine is executed. Upon returning from the signal search routine, step 216 checks if signal was found. If false, the flowchart returns to step 200 wherein the signal processor responds to the absence of signal. If true, step 218 determines if the absolute value of any image register is greater than a threshold value contained in the code plug. If false, the desired baud rate is detected and step 220 enables the bit clock with the selected phase from the signal search routine. The program then returns to step 200 for continued signal processing. If in step 218 an image accumulator is equal to or greater than the threshold, step 222 checks if the threshold has been executed after three consecutive executions of step 210. If false, the program returns to step 210 to again attempt signal searching, after which steps 216 or 218 can cause the program to return to step 200. If however step 220 is executed three consecutive times, the presence of a signal having a baud rate being an integer divisor is determined, and the program returns to step 200 wherein the signal processor responds to the absence of a signal being detected. It should be appreciated that the value of "three" in step 222 may be any positive non-zero integer value and may be stored in the code plug. Furthermore, in alternate embodiments, execution of step 222 may further initialize the signal search routine to values different from the values selected by either steps 206-208 or 212-214.

The flowchart of FIG. 5 shows the operation of the signal search routine of FIG. 4. The flowchart is entered at step 240 where the four accumulators 131-134, the total accumulator 139, and the time 148 are initialized to values selected by the flow chart of FIG. 4. Additionally, values X, Y, and image accumulators are initialized to "0", and the received signal is initially sampled.

Then step 242 adds 1 to X and if X=5 then changes X=1. This has the overall effect of producing X equal to values 1 through 4 and then return to 1. Step 242 further adds 1 to Y and if Y=9 then changes Y=1. This has the overall effect of producing Y equal to values 1 through 8 and then return to 1. Step 242 additionally decrements the time value, delays one quarter of a bit and samples the received signal. Step 244 then checks if the time value=0. If true, there are too few transitions in the received signal to determine the presence of the predetermined baud rate and step 250 returns to the calling routine to indicate the absence of the signal. Otherwise, step 252 checks if an edge is detected by comparing the latest sample of the received signal with an immediately prior sample. If the same, an edge is not detected and the flowchart returns to step 242. If true, the edge is processed.

The value X indicates one of four sample windows used to sample the received signal. Each sample window has a corresponding and unique combination of accumulators within the multiplicity of accumulators 131-134. A transition in one of the four windows causes a count to be changed in the corresponding accumulators. Step 254 shows which two of the accumulators are decremented in response to an edge being detected in a sample window. Additionally, the total accumulator is decremented. Then the flowchart executes step 256 which shows how the image registers count in response to an edge detected in a sample window and the value of Y.

Step 258 checks if any accumulator 131-134 has a value less than or equal to zero. If false, step 260 checks if the total accumulator has a value of zero. If false, the flowchart returns to step 242. If true, it is determined that signal is not found and the flowchart proceeds to step 250 as previously described. Referring back to step 258, if any accumulator has a value zero less than or equal to, step 262 checks if the signal presence search mode is selected. If true, the conditions for the detection of the presence of signal have been met and step 270 proceeds to a routine of FIG. 6 to respond to the presence of the signal. If the signal presence search mode has not been selected, step 262 proceeds to step 272 to check if every accumulator 131-134 has a value of zero. If true, the conditions for the absence of signal have been met and the aforementioned step 250 is executed. If false, step 274 checks if the total accumulator equals zero. If true, the conditions for the presence of signal have been met and the aforementioned step 270 is executed. If false, the flowchart returns to step 242 to continue processing information.

FIG. 6 shows selecting the phase of the bit clock in response to the detection of the presence of the signal. The determination of the presence of the signal has been indicated by execution of step 270 of FIG. 5. Step 280 creates a four bit vector in response to the values within the four accumulators 131-134. Effectively, a zero is generated for each accumulator if the accumulator has a value of zero or less, otherwise a one is generated for the accumulator. Step 282 then determines the appropriate phase for the sample clock in response to the vector. Observe that the same table applies to either the selection of the signal presence search mode or the signal absence search mode. In response to the vector, one of eight phases is selected corresponding to phases A-H. The phase selection corresponds to the generation of signal 155.

FIG. 7 illustrates the response of the signal detector to a strong signal. Line 300 corresponds to eye patterns of a received signal under strong signal conditions, wherein transitions occur at events 302, 304 and 306. Line 310 shows the occurrence of sample windows 1-4 with respect to transitions 302-306. The transitions all occur within sample window 2. Each time a transition occurs in sample window 2, accumulators 1-2 and 2-3 are decremented. Under strong signal, transitions of this example will always occur in window 2.

If: the signal presence search mode was selected; accumulators 131-134 were initialized with 13; the total was initialized with 16; and all of the transitions occurred within sample window 2, after the occurrence of 13 transitions, accumulators 1-2 and 2-3 would simultaneously reach a value of zero, thereby satisfying the signal found criterion. The resulting 4 bit vector would be 0011 which according to the table of step 282, results in the selection of phase "H". Line 315 shows the occurrence of sample signal 42 with respect to bits defined by transitions 302-306. The selection of phase "H" on line 315 substantially corresponds to the center of each bit.

Alternately if: the signal absence search mode was selected; accumulators 131-134 were initialized with 4; the total was initialized with 16; and all of the transitions occurred within sample window 2, only accumulators 1-2 and 2-3 would decrement while accumulators 3-4 and 4-1 would remain at their initialized value. After 16 transitions, the total accumulator would equal zero, thereby satisfying the signal found criterion. The resulting 4 bit vector would again be 0011 which according to the table of step 282, again results in the selection of phase "H".

Thus in the example of the signal of FIG. 7, if the signal presence search mode were selected, the signal would be detected after 13 transitions, while in the signal absence search mode were selected, the presence of the signal would be detected after 16 transitions. Thus by anticipating the presence of the signal, the signal may be more rapidly detected.

FIG. 8 illustrates the response of the signal detector to a weak signal. Line 320 corresponds to eye patterns of a received signal under weak signal conditions, wherein transitions occur at events 322, 324 and 326. Under weak signal conditions, the location of transitions are randomly affected by noise. Line 330 shows the occurrence of sample windows 1-4 with respect to transitions 322-326. Transitions 322 and 326 occur within sample window 1 while transition 324 occurs within sample window 2. Each time a transition occurs in sample window 1, accumulators 4-1 and 1-2 are decremented. Each time a transition occurs in sample window 2, accumulators 1-2 and 2-3 are decremented. Under weak signal, transitions of this example will occur in either windows 1 or 2.

If: the signal search' presence mode was selected; accumulators 131-134 were initialized with 13; the total was initialized with 16; and all of the transitions occurred within sample windows 1 and 2, after the occurrence 13 transitions, accumulator 1-2 would reach a value of zero since it is decremented in response to transitions detected in either window 1 or 2. This satisfies the signal found criterion. The resulting 4 bit vector would be 0111 which according to the table of step 282, results in the selection of phase "G". Line 335 shows the occurrence of sample signal 42 with respect to bits defined by transitions 322-326. The selection of phase "G" on line 335 substantially corresponds to the center of each bit.

Alternately if the signal absence search mode was selected and accumulators 131-134 were initialized with 4, the total was initialized with 16, and all of the transitions occurred within sample windows 1 and 2, only accumulators 4-1, 1-2 and 2-3 would decrement while accumulators 3-4 would remain at it's initialized value. After 16 transitions, the total accumulator would equal zero, thereby satisfying the signal found criterion. The resulting 4 bit vector would be 0010 which according to the table of step 282, again results in the selection of phase "G".

Thus as in the example of the signal of FIG. 7, FIG. 8 also shows that correctly anticipating the presence of signal results in more rapid signal detection. Furthermore, FIGS. 7 and 8 show selection of identical center sample phases from either the signal presence search mode or the signal absence search mode.

FIG. 9 illustrates the response of the signal detector to the absence of a signal, or the presence of noise. Line 340 corresponds to transition patterns of the received signal noise, wherein transitions occur at events 342-348. Line 350 shows the occurrence of sample windows 1-4 with respect to transitions 342-348. The transitions effectively occur randomly within sample windows 1-4 (although transitions are shown only occurring within windows 1, 2 and 4). Each time a transition occurs in a sample window, the corresponding accumulators are decremented. Under noise conditions, on the average, the same number of transitions will occur within every sample window.

If: the signal search mode was selected; accumulators 131-134 were initialized with 13; the total was initialized with 16; and the transitions randomly occurred within every window, after the occurrence 16 transitions, an average of 4 transitions would have occurred within each sample window causing each accumulator to be decremented by 8, leaving a remainder of 5 in each accumulator. Thus the criterion for signal has not been met within the 16 total transitions, thereby satisfying the signal absence criterion.

Alternately, if: the signal absence search mode was selected; accumulators 131-134 were initialized with 4; the total was initialized with 16; and transitions occurred every third window, within 8 transitions all of the accumulators would decrement to zero, thereby satisfying the criterion for the absence of signal detection.

Thus in the example of the signal of FIG. 9, if the signal presence search mode were selected, the absence of signal would be detected after 16 transitions, while in the signal absence search mode, the absence of the signal would be detected after 8 transitions. Thus by correctly anticipating the absence of the signal, the absence of signal may be more rapidly detected. It should be appreciated that an optimum distribution of noise transitions has been selected for this example, and typically more transitions will be required to correctly detect noise.

FIG. 10 illustrates the response of the signal detector to a strong signal having the desired baud rate. Line 360 corresponds to eye patters of a received signal under strong signal conditions, wherein transitions occur at events 362, 364 and 366. Line 370 shows the occurrence of sample windows 1-4 with respect to transitions 362-346. The transitions all occur within sample window 2. Each time a transition occurs in an even sample window 2, image registers 1-2 and 2-3 are decremented, and each time a transition occurs in an odd sample window 2, image registers 1-2 and 2-3 are incremented. Under strong signal, transitions of this example will always occur in window 2.

If a transition occurs every bit interval the image registers will be decremented as many times as will be incremented. Independent of the selected signal search mode, if the total was initialized with 16, and signal was detected between 13 and 16 transitions, all of the image accumulators would have a value substantially equivalent to zero, thereby satisfying the signal found criterion.

FIG. 11 illustrates the response of the signal detector to a strong signal having the baud rate one half of the desired baud rate. Line 380 corresponds to eye patters of a received signal under strong signal conditions, wherein transitions occur at events 382 and 386. Line 390 shows the occurrence of sample windows 1-4 with respect to transitions 382 and 386. The transitions all occur within an even sample window 2 in response to which image registers 1-2 and 2-3 are decremented, however, no transition occurs in an odd sample window 2, thus image registers 1-2 and 2-3 are not incremented. If a transition occurs every even bit interval the image registers will be only be decremented. Independent of the selected signal search mode, if the total was initialized with 16 and signal was detected between 13 and 16 transitions, image registers 1-2 and 1-3 would have absolute values greater than or equal to 13. If the threshold for any image register were determined to be 12, signal found criterion would not be met according to step 218 of FIG. 4.

Thus the invention is capable of simultaneously detecting the presence of signal having a predetermined baud rate having transitions randomly occurring between bits while positively determining that the detected baud rate that is not an integer divisor of the predetermined baud rate.

FIG. 12 shows a table indicating the operation of the invention under conditions similar to those of FIG. 7. In the example, a total of 16 transitions are recorded. The first two rows show that 15 transitions occur in sample window 2 and one transition occurs in sample window 3. The third and forth rows show the counts accumulated in accumulators 131-134. In the signal presence search mode, the fifth row shows the resulting vector used in step 282 with a signal threshold of 13. In actuality the signal would have been determined to be found after any accumulator accumulated 13 counts. This vector assumes the transition that occurred in window 3 occurred after the 13th transition. Had the transition occurred prior to the 13th transition, accumulator 2-3 would accumulate 13 counts before any other, resulting in a vector of 1011 which would result in a phase of "A" as opposed to a phase of "H" which results from the 0011 vector shown in the fifth row. The sixth row shows the resulting vector in the signal absence search mode.

FIG. 13 shows a table indicating the operation of the invention under conditions similar to those of FIG. 8. In the example, a total of 32 transitions are recorded. The first two rows show that 14, 12, 1 and 5 transitions occur in sample window 1, 2, 3 and 4 respectively. The third and fourth rows show the counts accumulated in accumulators 131-134. In the signal presence search mode, the fifth row shows the resulting vector used in step 282 with a signal threshold of 26. In actuality the signal would have been determined to be found after the total accumulator accumulated 26 counts, which may have occurred any time between the 26th and 32nd transition depending upon the received signal. The sixth row shows the resulting vector in the signal absence search mode.

FIG. 14 shows a table indicating the operation of the invention under conditions similar to those of FIG. 9. In the example, a total of 16 transitions are recorded. The first two rows show that 4, 6, 2 and 4 transitions occur in sample windows 1, 2, 3 and 4 respectively. The third and forth rows show the counts accumulated in accumulators 131-134. In the signal presence search mode, the fifth row shows the resulting vector which indicates that signal absence is detected. The sixth row shows the resulting vector in the signal absence search mode. As explained with respect to FIG. 9, this vector could occur any time between the 8th and 16th transition.

In one application of the invention three parameters may be adjusted to govern the performance of the invention.

The first parameter is the total edge count. By increasing this parameter, the ability of the invention to distinguish the signal from noise or other signals is improved. This is because the invention has more samples from which to make a judgement. This ability is improved at the expense of the extra power consumed in order to accumulate the additional transitions. For example if in the signal of FIG. 13 only 16 samples were taken and a threshold of 13 was used, the presence of the signal may have been incorrectly missed depending upon the occurrence of the transitions, while the presence of the signal was found using 32 transitions. The first 16 transitions may have occurred 5, 6, 1, 4 in windows 1, 2, 3 and 4 respectively. On the other hand if the signal of FIG. 13 was determined to be absent (by having selected a threshold of 28 instead of 26) and only 16 samples were taken and a threshold of 14 used, the presence of the signal may have incorrectly been detected. The first 16 transitions may have occurred 7, 7, 1, 1 in windows 1, 2, 3 and 4 respectively. Thus by taking more samples a more accurate determination may be made.

False detection of the presence of a signal is undesirable because in response to a signal detection, the paging receiver maintains the operation of the receiver for a long interval thereafter in order to detect a POCSAG sync code. Since noise is present, no sync code will be found. Thus battery power is unnecessarily expended searching for sync code and the battery life of the pager degrades. However, different pager applications may require different sensitivity and falsing characteristics, the invention provides adjusting the sensitivity and falsing performance. Furthermore, with the advent of POCSAG 1200 baud protocol, the invention provides a means for rejecting GSC signals having 600 and 300 baud data rates, thereby eliminating a major source of falsing.

The second parameter is the threshold count, either in the signal present search mode or the signal absent search mode. This parameter establishes the relative sensitivity of the signal detection. For example FIG. 13 shows a relatively noisy signal. If a signal threshold of 28 or a noise threshold of 5 where used, the invention would not have detected a signal. Adjusting the sensitivity allows the sensitivity of the invention to be matched to the desired system sensitivity or the individual pager sensitivity.

The third parameter is the maximum integration time. This parameter allows the invention to account for the maximum number of bits not having transitions. For example, if a signal having no transitions at all was received, it is desirable to determine the absence of the baud rate quickly in order to return to a power conservation mode. In practice, this parameter is chosen to substantially provide for the maximum time in which the total edge count may occur in the presence of the baud rate.

Figure 1:
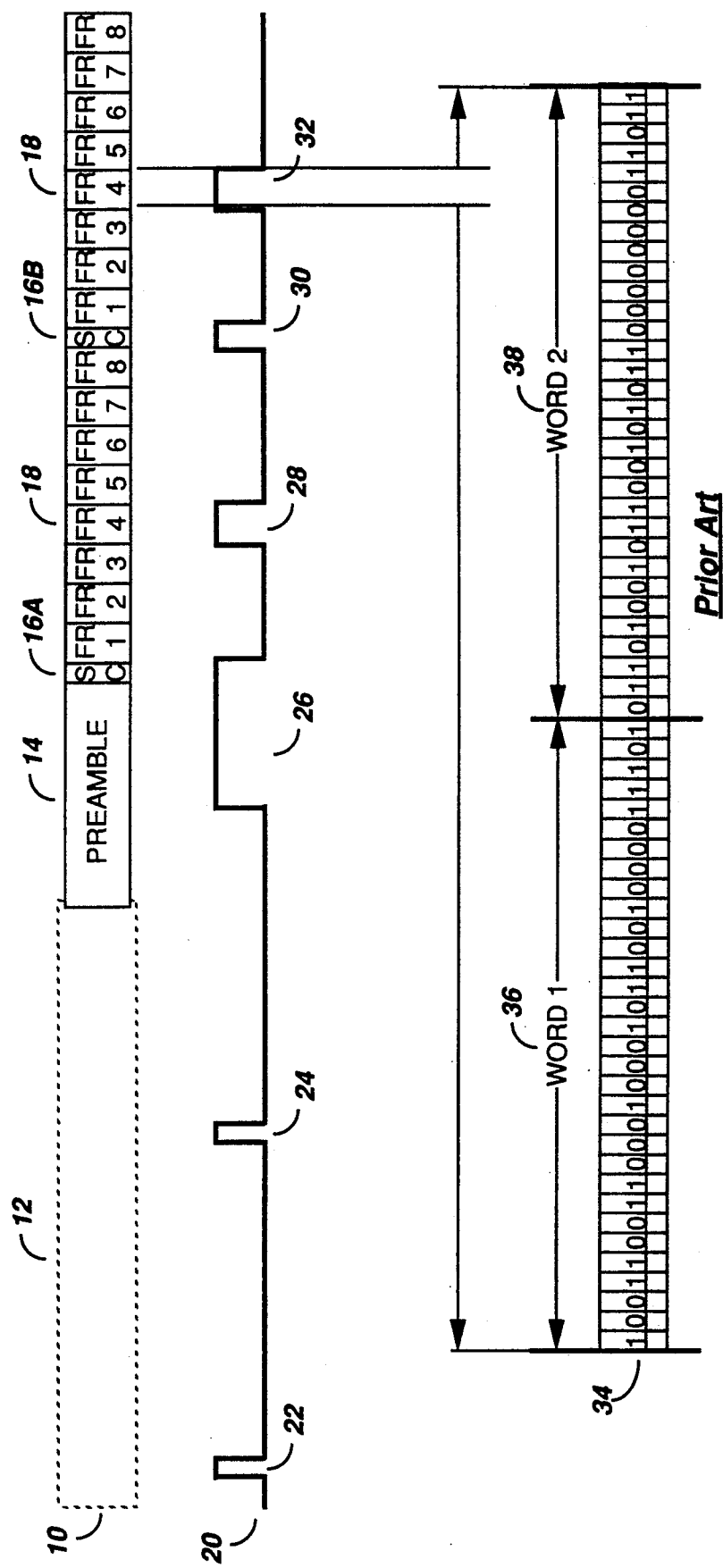
FIG. 1 shows a prior art implementation of the POCSAG signal and a paging receiver's operation in response thereof.
Figure 15:
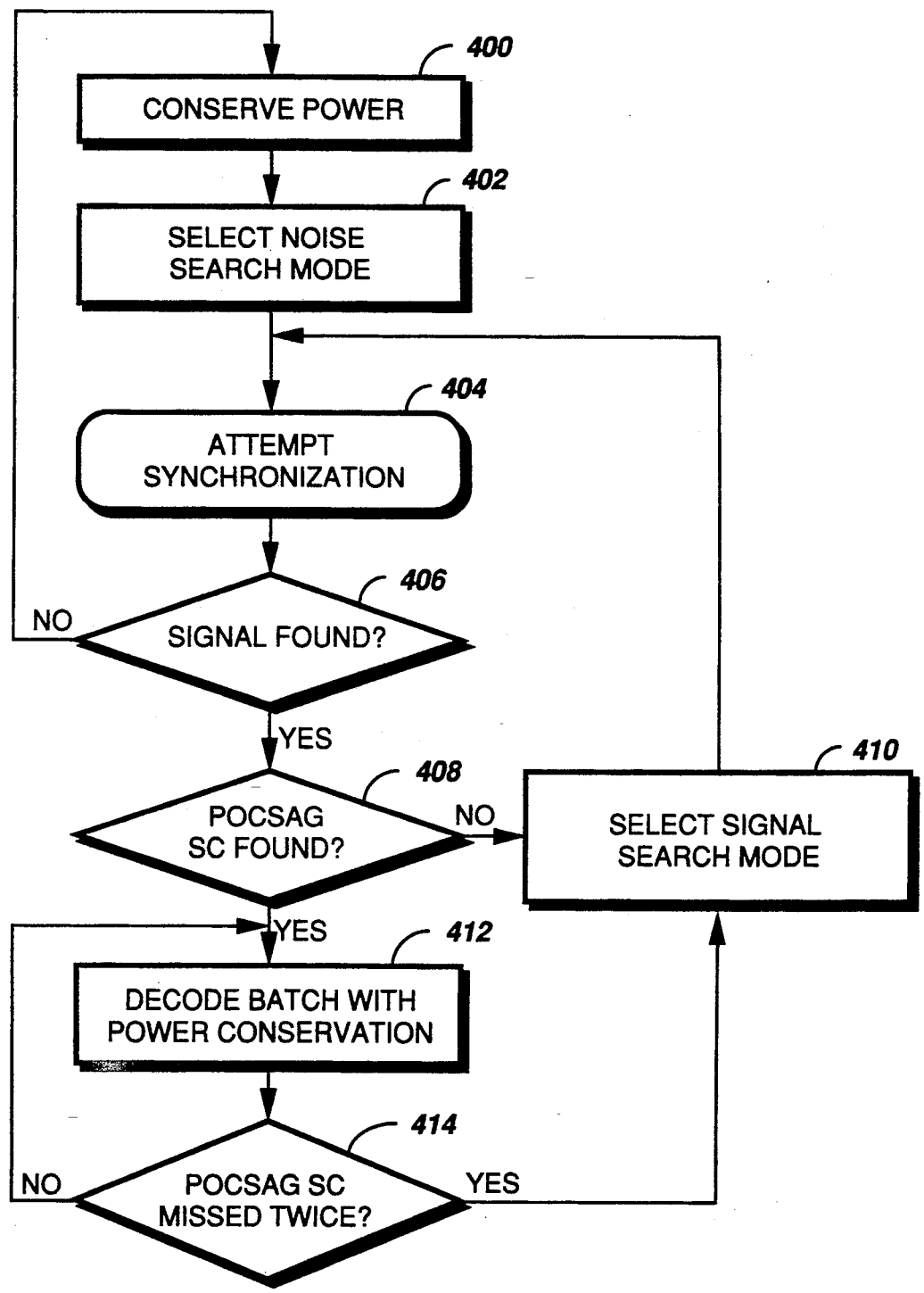
FIG. 15 shows a flowchart which selects between the signal present and signal absent search modes.

FIG. 15 shows a flowchart which selects between the signal present and signal absent search modes. Beginning at step 400, which corresponds to intervals between intervals 22 and 24 of FIG. 1, power is conserved. During this mode, the signal has been determined to be absent. Step 402 corresponds to the beginning of intervals 22 and 24 of FIG. 1. The signal absent search mode is selected, because it is anticipated that the signal is indeed absent. Then step 404 executes the aforementioned signal absent search. Step 406 then checks if a signal was found. If not, the flowchart returns to step 400. If found, step 408 checks for a POCSAG sync code. If not found, the flowchart selects the signal present mode and step 404 is again executed. If in step 408 the POCSAG sync code was found, step 412 decodes the POCSAG batch with power conservation in a known manner. The step 414 checks if the POCSAG sync code was missed twice. If false, the flowchart returns to step 412. If true, then step 410 selects the signal search mode and returns to step 404.

This flowchart shows that the invention operates in a signal search mode corresponding to the last detected signal condition. If the absence of signal was previously detected, the invention operates in the signal absence search mode. If the presence of signal was previously detected, the signal operates in signal presence search mode. Thus in the presence of noise, the invention will more quickly detect the absence of signal. Operating the pager in this mode during intervals 22 and 24 of FIG. 1 conserves additional power with respect to the prior art techniques which search for either predetermined times or a predetermined number of transitions. If the presence of signal was previously detected, the invention operates in the signal presence search mode. Thus in steps 404–410, more time may be expended searching for sync codes in step 408, and less time may be expended searching for the presence of the signal in step 404, thereby improving the operation of the pager.

The invention provides a means for operating a microcomputer at a low bus rate. The invention samples the received signal at a relatively low rate of four times per bit, and only accumulates transitions in respective accumulators during the integration time. Only minor calculations and no phase adjustments are made during the integration time as in the prior art microcomputer based bit synchronizers. A simplified calculation is made on the distribution of the accumulations in order to detect signal or noise, that is to determine if one or all of the registers have a value of zero. As a result of the calculation, a bit clock in phase with the data can be established. The simplifications also reduce the demand for bus cycles, thus a means is provided which allows the microcomputer to operate at a lower bus rate during bit synchronization. This further reduces power consumption and extends the battery life of the paging receiver. Additionally, the simple operation and reduced complexity of the invention provides implementation of the invention in integrated circuitry, without compromising the rapid detection aspects of the invention.

It can be appreciated that the invention in one form comprises only a signal presence or absence detector. In another form the invention comprises only a means for detecting the presence of a predetermined baud rate and the absence of a baud rate being an integer divisor of the predetermined baud rate.

Many modifications may be made to the invention while remaining within the spirit and scope of the invention. The invention although shown in conjunction with a POCSAG signal may be used in conjunction with other protocols having predetermined baud rate. Alternately, the accumulators may be analyzed any time after the conditions are met for the determination of the presence or absence of the signal. Additionally, more or less sample windows may be used. For example, if six sample windows were used, a transition occurring within a sample window may cause two or three accumulators to record the count, and analysis similar to the aforementioned analysis may be used to determine the presence or absence of the signal. It can further be appreciated that other embodiments may include a number of alterations. The phase setting of the bit clock is predetermined, in alternate embodiments, the number of possible phases of the bit clock can be increased and the bit clock's phase chosen by analyzing the values of the accumulators. For example, a weighted average of the accumulators can be used to determine the average location of the transitions, and the bit clock can be set to be 180° out of phase with the average location. It should be further appreciated that the steps of selecting the phase of the bit clock can be disregarded, or the bit clock means 168 can be eliminated, and the invention can be used as a signal presence or absence detector. Furthermore, the invention has been described with respect to a binary signal having two levels per symbol. The invention may additionally operate on a signal having more than two levels per symbol wherein transitions occur between symbols.

It should be further appreciated that in an alternate embodiment, the setting of synchronization parameters with the code plug can be eliminated. The synchronization parameters configured to be a predetermined part of the operation of the synchronizer.

While the above principles of the invention have been described with a specific apparatus, it is to be clearly understood that this description is made by way of example only and not a limitation to the scope of the invention as set forth in the accompanying claims.

What is claimed is:

1. A receiver for receiving a signal having transitions between symbols occurring at a predetermined baud rate and having information within the symbols, comprising:
   demodulator means for demodulating the signal;
   means coupled to the demodulator means for detecting the presence of the signal, the means comprising:
     a multiplicity of counting registers;
     means for establishing an integer number of sample windows per symbol, each sample window having a corresponding unique combination of a plurality of counting registers within said multiplicity of counting registers;
     means for sensing the transitions of a received signal, the transitions occurring within each established sample window;
     means for counting in the counting registers corresponding to each sample window in which a transition is sensed; and
     means for generating a presence signal in response to a counting register having a predetermined number of counts;
   means for determining the absence of the presence signal;
   means for conserving power to the demodulator means in response to the absence of the presence signal; and
   means coupled to the demodulating means for detecting the information in response to the presence signal.

2. In a receiver, a method of detecting the presence of a first signal having transitions between symbols occurring at a predetermined baud rate, the method comprising the steps of:
   establishing an integer number of sample windows per symbol, each sample window having a corresponding unique combination of a plurality of counting registers within a multiplicity of counting registers;
   receiving the first signal and producing a received signal having transitions;
   sensing the transitions of the received signal occurring within each established sample window;
   counting in the counting registers corresponding to each sample window in which a transition is sensed;
   generating a presence signal in response to a counting register having a predetermined number of counts; and
   determining the absence of the presence signal;
   conserving power to the receiver in response to the absence of the presence signal.

3. The method according to claim 2 wherein said step of generating generates the presence signal in response to the counting register having the predetermined number of counts within the occurrence of a predetermined number of edges.

4. The method according to claim 2 further comprising the step of generating an absence signal in response to any counting register not having the predetermined number of counts within the occurrence of a predetermined number of edges.

5. The method according to claim 2 further comprising the step of generating, in response to the presence signal, a sample signal indicative of the center of a symbol wherein the center is determined as a function of the counts in the multiplicity of counting registers.

6. The method according to claim 2 wherein:
   the integer number of sample windows corresponds to four;
   the plurality of counting registers corresponds to two;
   the multiplicity of counting registers corresponds to four;
   the first of the four sample windows has a corresponding combination of the first and second of the four counting registers;
   the second of the four sample windows has a corresponding combination of the second and third of the four counting registers;
   the third of the four sample windows has a corresponding combination of the third and forth of the four counting registers; and
   the forth of the four sample windows has a corresponding combination of the forth and first of the four counting registers.

7. The method according to claim 2 further comprising the step of:
   initializing the multiplicity of counting registers to a predetermined value; and
   said step of counting counts by decrementing a corresponding counting register; and
   said step of generating generates the detect signal in response to a count register being equal to zero, thereby having a number of counts corresponding to the predetermined value.

8. The method according to claim 2 further for rejecting a second signal having transitions between symbols occurring a second baud rate, the second baud rate being an integer divisor of the predetermined baud rate wherein:
   said step of establishing further establishes from the integer number of sample windows, an integer number of second sample windows corresponding to an initial symbol and symbols occurring at an integer number of symbols thereafter, the integer number of symbols corresponding to the integer divisor, wherein the number of second sample windows have a corresponding unique combination of a plurality of second counting registers within a multiplicity of second counting registers;

said step of counting additionally counts in the second counting registers corresponding to each second sample window in which a transition is sensed; and said step of generating generates the presence signal in response to the counting register having a predetermined number of counts, and a second counting register, corresponding to the count register having the predetermined number of counts, having more than a second predetermined number of counts and less than a third predetermined number of counts.

9. The method according to claim 8 wherein the baud rate of the second signal corresponds to one half the baud rate of the predetermined baud rate and said step of counting counts in a first direction in the second counting registers in response to a transition sensed in the second sample windows producing a count value therein, and the second predetermined number of counts and third predetermined number of counts correspond to second and third predetermined values, respectively.

10. The method according to claim 9 further comprising the step of:

initializing the second counting registers to a value of zero; and wherein said step of counting counts in a second direction, opposite the first direction, in the second counting registers in response to a transition sensed in sample windows exclusive of the second sample windows, and in response to the third predetermined value having an identical magnitude and opposing polarity of the second predetermined value.

11. In a receiver, a means for detecting the absence of a signal having transitions between symbols occurring at a predetermined baud rate, the means comprising:

a multiplicity of counting registers;

means for establishing an integer number of sample windows per symbol, each sample window having a corresponding unique combination of a plurality of counting registers within said multiplicity of counting registers;

means for receiving a received signal having transitions;

means for sensing the transitions of the received signal occurring within each established sample window;

means for counting in the counting registers corresponding to each sample window in which a transition is sensed;

means for generating an absence signal in response to all of the counting registers exceeding a predetermined number of counts; and conserving power to the receiver in response to the absence signal.

12. In a receiver, a method of detecting the absence of a signal having transitions between symbols occurring at a predetermined baud rate, the method comprising the steps of:

establishing an integer number of sample windows per symbol, each sample window having a corresponding unique combination of a plurality of counting registers within a multiplicity of counting registers;

receiving a transmitted signal and producing a received signal having transitions;

sensing the transitions of the received signal occurring within each established sample window;

counting in the counting registers corresponding to each sample window in which a transition is sensed;

generating an absence signal in response to all of the counting registers exceeding a predetermined number of counts; and conserving power to the receiver in response to the absence of the presence signal.

13. The method according to claim 12 wherein said step of generating generates the absence signal in response to all of the counting registers exceeding the predetermined number of counts within the occurrence of a predetermined number of edges.

14. The method according to claim 12 further comprising the steps of generating a presence signal in response to any of the counting register not exceeding the predetermined number of counts within the occurrence of a predetermined number of edges.

15. The method according to claim 14 further comprising the step of generating a sample signal indicative of the center of the symbol signal in response to the presence signal wherein the center is determined as a function of the values in the multiplicity of counting registers.

16. The method according to claim 14 further for rejecting a second digital signal having transitions between digital symbols occurring a second baud rate, the second baud rate being an integer divisor of the predetermined baud rate wherein:

said step of establishing further establishes from the integer number of sample windows, an integer number of second sample windows corresponding to an initial symbol and symbols occurring an integer number of symbols thereafter, the integer number of symbols corresponding to the integer divisor, wherein the predetermined number of second samples windows have a corresponding unique combination of a plurality of second counting registers within a multiplicity of second counting registers;

said step of counting additionally counts in the second counting registers corresponding to each second sample window in which a transition is sensed; and said step of generating generates the presence signal in response to the counting register having a predetermined number of counts, and a second counting register, corresponding to the count register having the predetermined number of counts, having more than a second predetermined number of counts and less than third predetermined number of counts.

17. The method according to claim 16 wherein the baud rate of the second signals corresponds to one half the baud rate of the predetermined baud rate and further comprising the step of:

initializing the second counting registers to a value of zero; and wherein said step of counting counts in a first direction in the second counting registers in response to a transition sensed in the second sample windows, and counts in a second direction, opposite the first direction, in the second counting registers in response to a transition sensed in sample windows exclusive of the second sample windows, and the third predetermined value having an identical magnitude and opposing polarity of the second predetermined value.

18. A receiver for receiving a signal having transitions between symbols occurring at a predetermined baud rate and having information within the symbols, comprising:

demodulator means for demodulating the signal;

means for selectively detecting the presence or absence of the signal, the means comprising:

a multiplicity of counting registers;

means for establishing an integer number of sample windows per symbol, each sample window having a corresponding unique combination of a plurality of counting registers within said multiplicity of counting registers;

means for selecting either presence detection or absence detection;

means for receiving a transmitted signal and producing a received signal having transitions;

means for sensing the transitions of the received signal occurring within each established sample window;

means for counting in the counting registers corresponding to each sample window in which a transition is sensed; and means generating a presence signal in response to the selection of presence detection and a counting register having a first predetermined number of counts; and means for generating an absence signal in response to the selection of absence detection and all of the counting registers exceeding a second predetermined number of counts;

means for conserving power to the demodulator means in response to the absence signal; and means for processing the information in response to the presence signal.

19. In a receiver, a method of selectively detecting the presence or absence of a signal having transitions between symbols occurring at a predetermined baud rate, the method comprising the steps of:

establishing an integer number of sample windows per symbol, each sample window having a corresponding unique combination of a plurality of counting registers within a multiplicity of counting registers;

selecting either presence detection or absence detection;

receiving a transmitted signal and producing a received signal having transitions;

sensing the transitions of the received signal occurring within each established sample window;

counting in the counting registers corresponding to each sample window in which a transition is sensed; and generating a presence signal in response to the selection of presence detection and a counting register having a first predetermined number of counts; and generating an absence signal in response to the selection of absence detection and all of the counting registers exceeding a second predetermined number of counts;

conserving power to the receiver in response to the absence signal.

20. The method according to claim 19 wherein:

said step of generating the presence signal generates the presence signal in response to the counting register having the predetermined number of counts within the occurrence of a first predetermined number of edges; and said step of generating the absence signal in response to all of the counting registers exceeding the second predetermined number of counts within the occurrence of a second predetermined number of edges.

21. The method according to claim 19 further comprising the steps of:

generating the absence signal in response to the selection of presence detection and any counting register not having the predetermined number of counts within the occurrence of a first predetermined number of edges;

generating a presence signal in response to the selection of absence detection and any of the counting register not exceeding the predetermined number of counts within the occurrence of a second predetermined number of edges.

22. The method according to claim 21 further comprising the step of generating a sample signal indicative of the center of the baud signal in response to the presence signal wherein the center is determined as a function of the values in the multiplicity of counting registers.

* * * * *